(12) United States Patent
Webster et al.

(10) Patent No.: US 9,614,459 B2
(45) Date of Patent: Apr. 4, 2017

(54) MODULATION OF SWITCHING SIGNALS IN POWER CONVERTERS

(71) Applicant: Control Techniques Limited, Newtown (GB)

(72) Inventors: Antony John Webster, Montgomery (GB); Simon David Hart, Welshpool (GB)

(73) Assignee: CONTROL TECHNIQUES LIMITED, Newtown (GB)

(*) Notice: Subject to any disclaimer, the term of this patent is extended or adjusted under 35 U.S.C. 154(b) by 254 days.

(21) Appl. No.: 14/446,509

(22) Filed: Jul. 30, 2014

(65) Prior Publication Data
US 2015/0036400 A1 Feb. 5, 2015

(30) Foreign Application Priority Data
Jul. 30, 2013 (GB) .................................. 1313576.9

(51) Int. Cl.
*H02M 3/24* (2006.01)
*H02M 7/5387* (2007.01)
*H02M 1/32* (2007.01)

(52) U.S. Cl.
CPC ......... *H02M 7/53871* (2013.01); *H02M 1/32* (2013.01); *H02M 7/5387* (2013.01); *H02M 2001/327* (2013.01)

(58) Field of Classification Search
CPC ............... H02M 1/32; H02M 7/53871; H02M 2001/327; H02M 7/5387
(Continued)

(56) References Cited

U.S. PATENT DOCUMENTS 7,453,679 B2 11/2008 Yokai et al.
8,030,874 B2 10/2011 Higuchi
(Continued)

FOREIGN PATENT DOCUMENTS

CN 102368668 3/2012
EP 2270453 1/2011
(Continued)

*Primary Examiner* — Adolf Berhane
*Assistant Examiner* — Afework Demisse
(74) *Attorney, Agent, or Firm* — Harness, Dickey & Pierce, P.L.C.

(57) ABSTRACT

There is provided a method and control system for controlling a switching device in a power converter according to a modulation scheme. The switching device couples a direct current (DC) source to provide an alternating current (AC) output at a particular switching frequency. The method comprises the step of, in each switching period, switching the switching device between active configurations providing a finite voltage at the output and inactive configurations providing a zero voltage at the output. The ratio between the total period of time in which the switching device is in an active configuration and the total period of time in which the switching device is in an inactive configuration is the same for each switching period and is determined according to the desired voltage at the AC output. However, in each switching period, there are at least two time periods in which the switching device is in an inactive configuration, and the ratio between those at least two time periods is changed in dependence on temperature associated with the switching device.

25 Claims, 8 Drawing Sheets

(58) Field of Classification Search
USPC .......................................................... 363/98
See application file for complete search history.

(56) References Cited

U.S. PATENT DOCUMENTS

| | | | |
|---|---|---|---|
| 8,644,045 B2 | 2/2014 | Hamatani | |
| 8,750,008 B2 * | 6/2014 | Sugiyama | ............... H02M 1/15 363/131 |
| 2010/0185350 A1 | 7/2010 | Okamura et al. | |
| 2013/0069570 A1 | 3/2013 | Chen et al. | |

FOREIGN PATENT DOCUMENTS

| | | | | |
|---|---|---|---|---|
| GB | 2505189 A * | 2/2014 | ............ | H02M 7/539 |
| JP | EP 2270453 A1 * | 1/2011 | ............. | G01K 3/005 |
| WO | 2012/096198 | 7/2012 | | |

* cited by examiner

Fig. 1
Prior Art

Zero voltage vectors

Active voltage vectors

MODULATION OF SWITCHING SIGNALS IN POWER CONVERTERS

CROSS-REFERENCE TO RELATED APPLICATION

This application claims the benefit and priority of Great Britain Patent Application No. 1313576.9 filed Jul. 30, 2013. The entire disclosure of the above application is incorporated herein by reference.

FIELD

The present disclosure relates to a method and control system for controlling a power converter by modulating switching signals in a switching device of the power converter.

BACKGROUND

Figure 1:
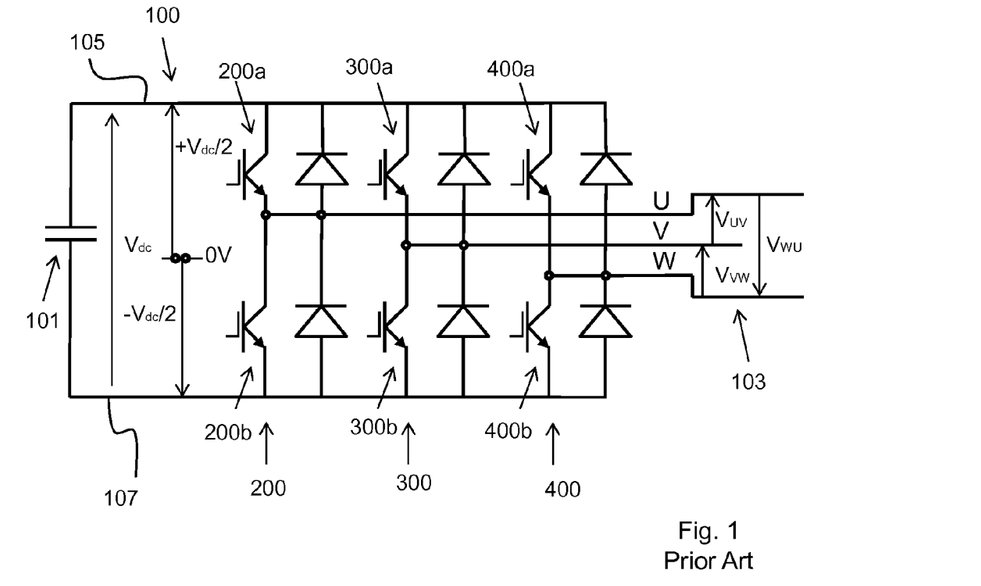
FIG. 1 shows a three phase inverter according to the prior art.

FIG. 1 shows a well-known three phase power inverter 100 for converting a DC power supply 101 to an AC output 103 which may then be connected to a load (not shown). The inverter comprises three separate phases 200, 300, 400 (also referred to as phases U, V, W respectively). Each phase includes two switches in series: 200a, 200b in phase 200/U; 300a, 300b in phase 300/V; and 400a, 400b in phase 400/W. Switches 200a, 300a and 400a are connected to the positive rail 105 (and may be referred to as the "upper" switches) and switches 200b, 300b and 400b are connected to the negative rail 107 (and may be referred to as the "lower" switches). In FIG. 1, each switch is an IGBT (insulated gate bipolar transistor) and, for each IGBT, an associated anti-parallel diode is also shown. However, any switches with fast switching capability may be used. A control system (such as a processor) (not shown) controls the switching of the switches 200a, 200b, 300a, 300b, 400a, 400b to control the AC output of the inverter 100.

Figure 2:
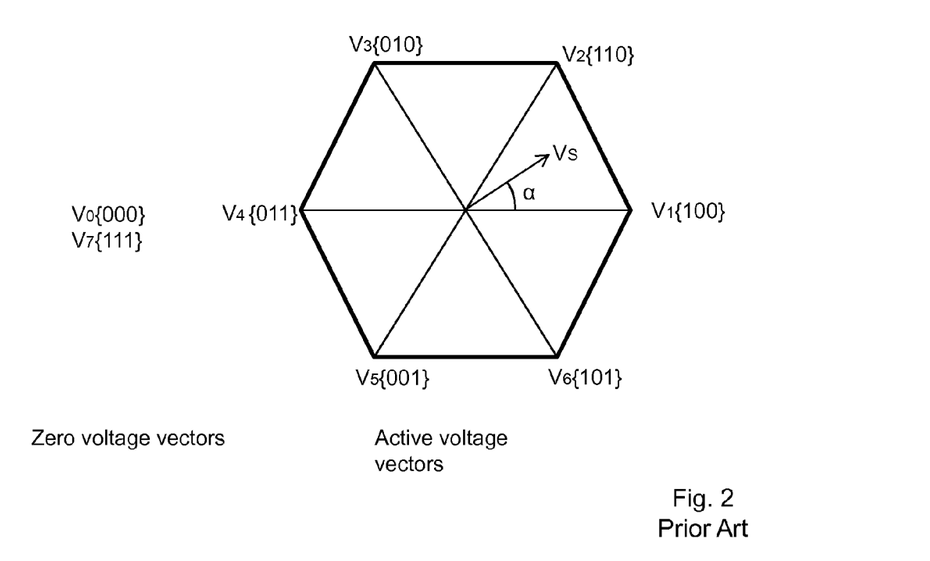
FIG. 2 shows a voltage switching hexagon for the three phase inverter of FIG. 1.

A sinusoidal output current can be created at AC output 103 by a combination of switching states of the six switches. However, the inverter 100 must be controlled so that the two switches in the same phase are never switched on at the same time, so that the DC supply 101 is not short circuited. Thus, if 200a is on, 200b must be off and vice versa; if 300a is on, 300b must be off and vice versa; and if 400a is on, 400b must be off and vice versa. This results in eight possible switching vectors for the inverter, as shown in Table 1. In Table 1, the vector values are the states of the three upper switches 200a, 300a, 400a, with the three lower switches 200b, 300b, 400b necessarily taking the opposite state to avoid shorting out the DC supply.

sentation of three-phase systems is well known to the skilled person and will not be described in detail. However, in general, any three-phase system can be represented uniquely by a rotating vector $V_S$, as shown in FIG. 2. The rotating vector $V_S$ comprises components of the six active vectors shown in Table 1 and FIG. 2. This is known as Space Vector Modulation (SWM). The voltage at the AC output 103 can be changed by varying the ratio between the zero voltage vectors $V_0$ and $V_7$ and the active vector $V_S$ (comprising components of $V_1$ to $V_6$) (the modulation index) by pulse width modulation (PWM) techniques.

Figure 3:
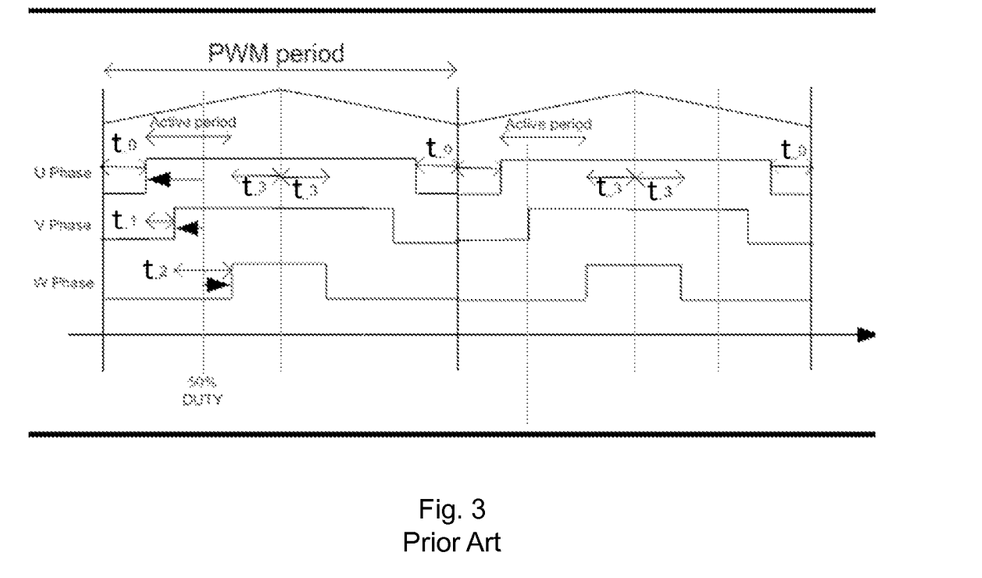
FIG. 3 shows an example of space vector modulation over two switching periods according to the prior art.

FIG. 3 shows an example of pulse width space vector modulation over two switching periods according to the prior art. The switching function for each upper switch 200a, 300a, 400a is a time waveform taking the value 1 when the upper switch is on and 0 when the upper switch is off (as will be appreciated, the switching function for each lower switch 200b, 300b, 400b will be the inverse of the corresponding upper switch) with dead-time included to prevent short circuiting. Thus a low represents the lower switch for the phase (e.g 200b, 300b, 400b) being ON and a high represents the upper switch for the phase (e.g 200a, 300a, 400a) being ON (neglecting dead-time protection). Referring to FIG. 3, during the first period t_0, all three upper switches 200a, 300a, 400a are off (value 0) which produces vector $V_0$ of Table 1. $V_0$ is a zero voltage vector, so this time period t_0 is an inactive period. In the second period t_1, switch 200a takes the value 1 and switches 300a and 400a take the value 0, which produces vector $V_1$, which is an active vector. In the third period t_2, switches 200a and 300a take the value 1 and switch 400a takes the value 0, which produces vector $V_2$, which is also an active vector. Finally, during the fourth period t_3, all three upper switches 200a, 300a, 400a are on (value 1) which produces zero voltage vector $V_7$ of Table 1. Thus, the active periods are t_1 and t_2 and the inactive period $t_i$ is t_0 and t_3. The ratio between the total active period (in this case, t_1+t_2) and total inactive period (in this case, t_0+t_3=$t_i$) determines the output voltage at the AC output. FIG. 3 shows a 50% duty cycle (i.e. 50% active) as an example. Other duty cycles may be operative.

FIG. 3 shows a typical space vector modulation (SVM) timing pattern for two PWM periods, with symmetric switching (i.e. t_0=t_3). The ratio of t_0 and t_3 as shown in FIG. 3 is one to one.

Figure 4:
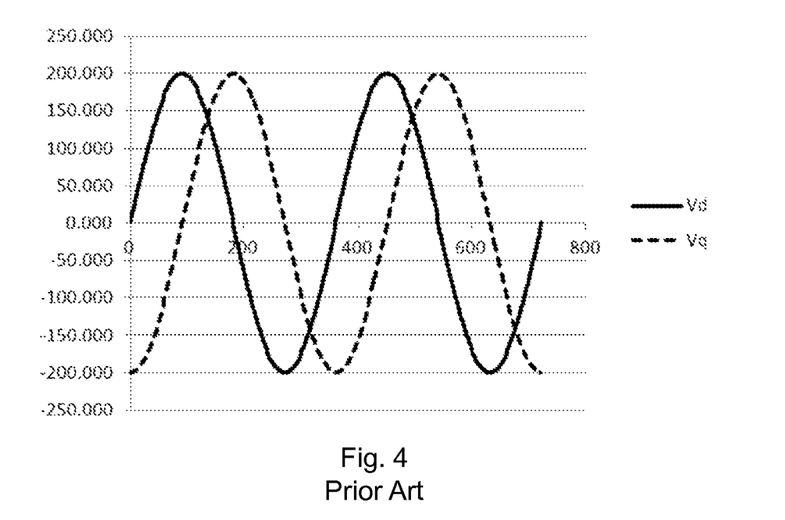
FIG. 4 shows an example of D and Q axis components of the desired output voltage for two output wave cycles versus output voltage angle according to the prior art.
Figure 5:
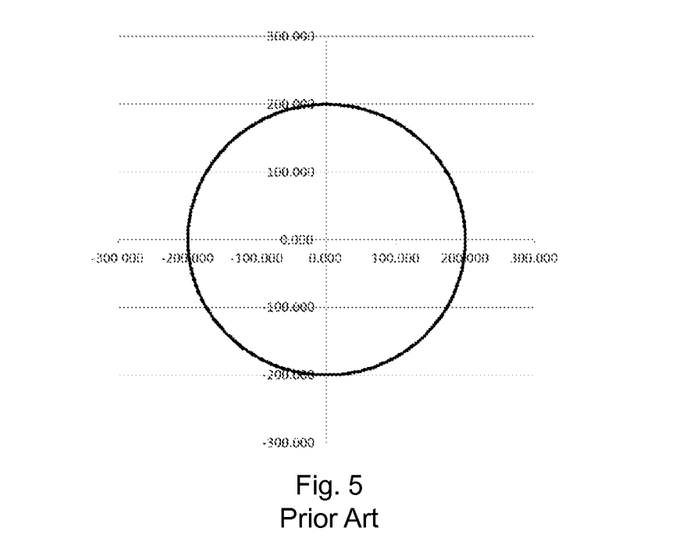
FIG. 5 shows an example of D and Q axis components of the desired output voltage as plotted on the X and Y axis according to the prior art.

FIG. 4 shows D and Q axis components of the desired output voltage for two output wave cycles versus output voltage angle. FIG. 5 shows D and Q axis components of the desired output voltage as plotted on the X and Y axis.

Figure 6:
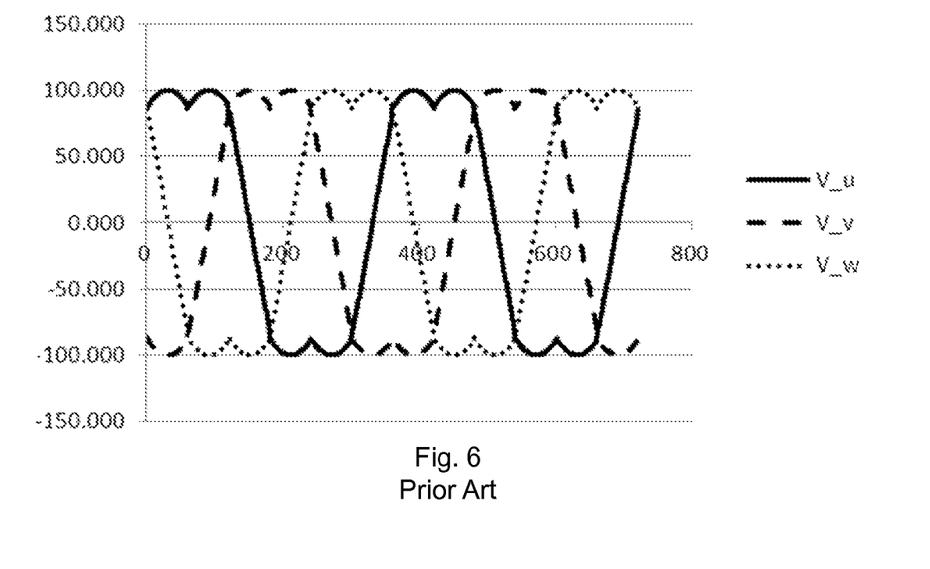
FIG. 6 shows an example of phase voltages (with respect to half dc bus) with symmetric switching (t_0=t_3) versus output voltage angle according to the prior art.

FIG. 6 shows phase voltages (with respect to the 0V line shown in FIG. 1, which is half of the dc bus) with symmetric

TABLE 1

| Vector | 200a | 300a | 400a | 200b | 300b | 400b | $V_{UW}$ | $V_{WV}$ | $V_{VU}$ | |
|---|---|---|---|---|---|---|---|---|---|---|
| $V_0 = \{000\}$ | OFF | OFF | OFF | ON | ON | ON | 0 | 0 | 0 | Zero |
| $V_1 = \{100\}$ | ON | OFF | OFF | OFF | ON | ON | $+V_{dc}$ | 0 | $-V_{dc}$ | Active |
| $V_2 = \{110\}$ | ON | ON | OFF | OFF | OFF | ON | 0 | $+V_{dc}$ | $-V_{dc}$ | Active |
| $V_3 = \{010\}$ | OFF | ON | OFF | ON | OFF | ON | $-V_{dc}$ | $+V_{dc}$ | 0 | Active |
| $V_4 = \{011\}$ | OFF | ON | ON | ON | OFF | OFF | $-V_{dc}$ | 0 | $+V_{dc}$ | Active |
| $V_5 = \{001\}$ | OFF | OFF | ON | ON | ON | OFF | 0 | $-V_{dc}$ | $+V_{dc}$ | Active |
| $V_6 = \{101\}$ | ON | OFF | ON | OFF | ON | OFF | $+V_{dc}$ | $-V_{dc}$ | 0 | Active |
| $V_7 = \{111\}$ | ON | ON | ON | OFF | OFF | OFF | 0 | 0 | 0 | Zero |

Figure 7:
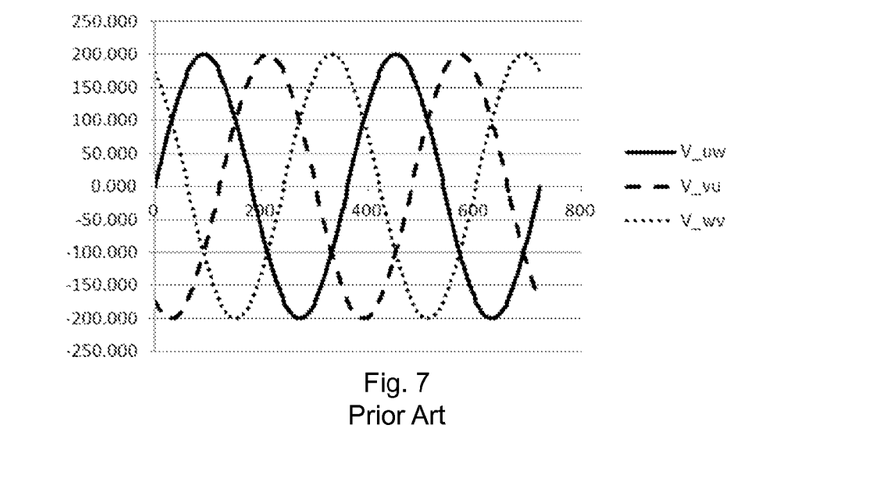
FIG. 7 shows an example of the resulting line to line voltage as seen by the motor load according to the prior art.

FIG. 2 shows the six active vectors and the two zero voltage vectors of Table 1 graphically portrayed in an inverter voltage switching hexagon. Such vectorial representation switching (t_0=t_3) versus output voltage angle (with a Dc bus of 250V and a 200VII peak demand). FIG. 7 shows the resulting line to line voltage as seen by the motor load.

At low output frequencies (such as output frequencies less than around 1 Hz) the temperature of each individual switch 200a, 200b, 300a, 300b, 400a, 400b can become excessive even if the current delivered by the drive is less than the inverter rated output current as each individual switch may be on for a period of time sufficient to cause excessive temperature of the switch.

Because of this, and other, problems, the control of switching power converters is an area of increasing interest.

It is an object of the described technique to provide an improved method and control system for a power converter.

SUMMARY

According to a first aspect, there is provided a method for controlling a switching device in a power converter according to a modulation scheme, the switching device for coupling a direct current (DC) source to provide an alternating current (AC) output at a particular switching frequency, the method comprising the: in each switching period, switching the switching device between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed in dependence on the temperature associated with the switching device.

The method varies the non-active (zero voltage) portion of the modulation scheme. The ratio between the total non-active portion and the total active portion is kept the same for all the switching periods, according to the desired output voltage. However, the ratio between the at least two inactive time periods changes, for instance in each switching period, whilst keeping the total non-active portion the same, in response to temperature associated with the individual switches of the switching device. The inventors have found that this helps to manage the temperature of the switches at a low switching frequency, without altering the switching period or swapping between switching frequencies. This method does not require a complex pulse width modulator. This method also does not require continual re-scaling of the current measurement or gain.

The ratio of t_0 and t_3 can be used to alter the ratio of upper to lower conduction times while still maintaining the same line to line voltage (as long as the sum of t_0 and t_3 remains constant).

In one embodiment, the ratio in temperature of the upper and lower IGBTs is altered by offsetting the output phase voltages which in turn alters the conduction times and thus the conduction losses. This is achieved by controlling the PWM switching pattern which results in a change in the ON times for the switches. This aims to reduce the probability of the drive tripping on excessive inverter temperature.

The method is particularly advantageous for low output frequencies, such as frequencies of 1 Hz or less. This method provides a degree of thermal control which either postpones or removes the need for output current rating reduction at low output frequencies. Thermal control may be provided in a low frequency region (for example below 1 Hz) based on the space vector modulation switching pattern.

The ratio between the at least two time periods in which the switching device is in an inactive configuration may be changed in a switching period in dependence upon temperature associated with the individual switches of the switching device.

The power converter may comprise a three phase power inverter. The switching device in the three phase inverter comprises three phases, each phase including two switches in series. One switch in each phase is connected to a positive rail, the other switch in each phase is connected to a negative rail and an output is connected between the two switches in each phase. However, the power converter need not comprise a three phase power inverter and the technique is applicable to any multilevel inverter.

The method may employ a space vector modulation scheme for controlling the power converter switching device. This is advantageous as it is able to produce a large range of output voltages.

In an embodiment at least one of the switches in the three phase inverter is an insulated gate bipolar transistor (IGBT). All the switches may be IGBTs. IGBTs have fast switching capability and are also highly efficient. IGBTs may be included in any inverters, not only three phase inverters.

According to a second aspect of the disclosure, there is provided a control system for a power converter switching device, the switching device for coupling a direct current (DC) source to provide an alternating current (AC) output at a particular switching frequency, the control system comprising: a controller for switching the switching device in the power converter according to a modulation scheme, the controller being arranged to switch the switching device, in each switching period, between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed in dependence on the temperature associated with the switching device.

The control system of the disclosure varies the non-active (zero voltage) portion of the modulation scheme. The ratio between the total non-active portion and the total active portion is kept the same for all the switching periods, according to the desired output voltage. However, the ratio between the at least two inactive time periods changes (whilst keeping the total non-active portion the same). This produces a way to manage the temperature of the switches at a low switching frequency, without altering the switching period or swapping between switching frequencies. The control system is particularly advantageous for low output frequencies.

The ratio between the at least two time periods in which the switching device is in an inactive configuration may be changed for instance every switching period or at a time determined by the control system.

According to a third aspect of the disclosure, there is provided a switching power converter comprising: a switching device for coupling a direct current (DC) source to provide an alternating current (AC) output at a particular switching frequency; and a controller for switching the switching device according to a modulation scheme, the controller being arranged to switch the switching device, in each switching period, between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed in response to the operating temperature associated with individual switches in the switching device.

The controller in the switching power converter varies the inactive portion of the modulation scheme, whilst keeping the ratio between the total inactive portion and the total active portion the same for all the switching periods, according to the desired output voltage. The ratio between the at least two inactive time periods changes in response to the operating temperature associated with individual switches in the switching device. This is particular useful at low switching frequency, without altering the switching period or swapping between switching frequencies, and is particularly advantageous for low output frequencies.

The ratio between the at least two time periods in which the switching device is in an inactive configuration may be changed every switching period in dependence upon the operating temperature of the switching device.

Features and advantages described in relation to one aspect of the described technique may also be applicable to another aspect of the described technique.

BRIEF DESCRIPTION OF THE DRAWINGS

Prior art arrangements have already been described with reference to accompanying FIGS. 1 to 7, in which.

The technique will now be further described, by way of example only, with reference to accompanying FIGS. 8 to 17, in which.

DETAILED DESCRIPTION

Symmetrical modulation methods, such as that described with reference to FIG. 3, split the inactive period $t_i$ in half, placing half the inactive period t_0 before the active period and the other half of the inactive period t_3 after the active period. Thus, in each switching period, there is a symmetric switching pattern. However, the inventors have found that using a particular non-symmetric switching pattern can ameliorate temperature rises in the switching devices.

Figure 8:
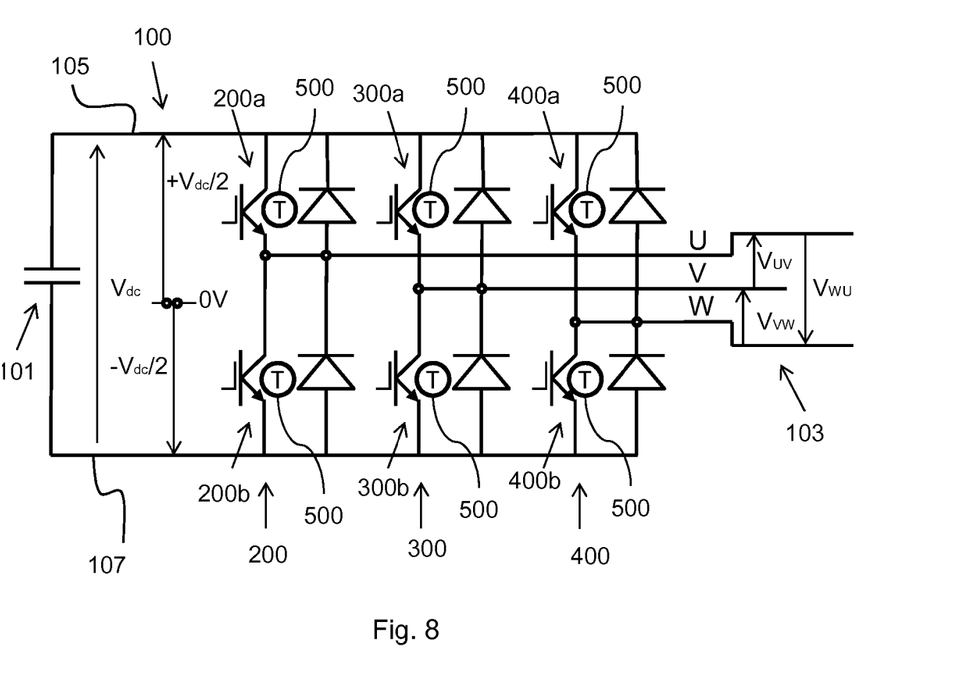
FIG. 8 shows a three phase inverter according to an embodiment of the disclosure.

FIG. 8 shows a three phase inverter according to an embodiment of the disclosure. As with FIG. 1, FIG. 8 shows a three phase power inverter 100 for converting a DC power supply 101 to an AC output 103 which may then be connected to a motor load. The inverter comprises three separate phases 200, 300, 400. Each phase includes two switches in series: 200a, 200b in phase 200; 300a, 300b in phase 300; and 400a, 400b in phase 400. Switches 200a, 300a and 400a are connected to the positive rail 105 (and may be referred to as the "upper" switches) and switches 200b, 300b and 400b are connected to the negative rail 107 (and may be referred to as the "lower" switches). In FIG. 8, each switch is an IGBT (insulated gate bipolar transistor). However, any switches with fast switching capability may be used.

FIG. 8 also shows temperature sensors 500 for sensing the temperature of the associated switch 200a, 200b, 300a, 300b, 400a, 400b. These temperature sensors may be any sensor suitable to sense the temperature of the individual switch 200a, 200b, 300a, 300b, 400a, 400b. For instance the temperature sensors 500 may comprise a thermocouple placed close to each switch 200a, 200b, 300a, 300b, 400a, 400b on the associated PCB.

Figure 9:
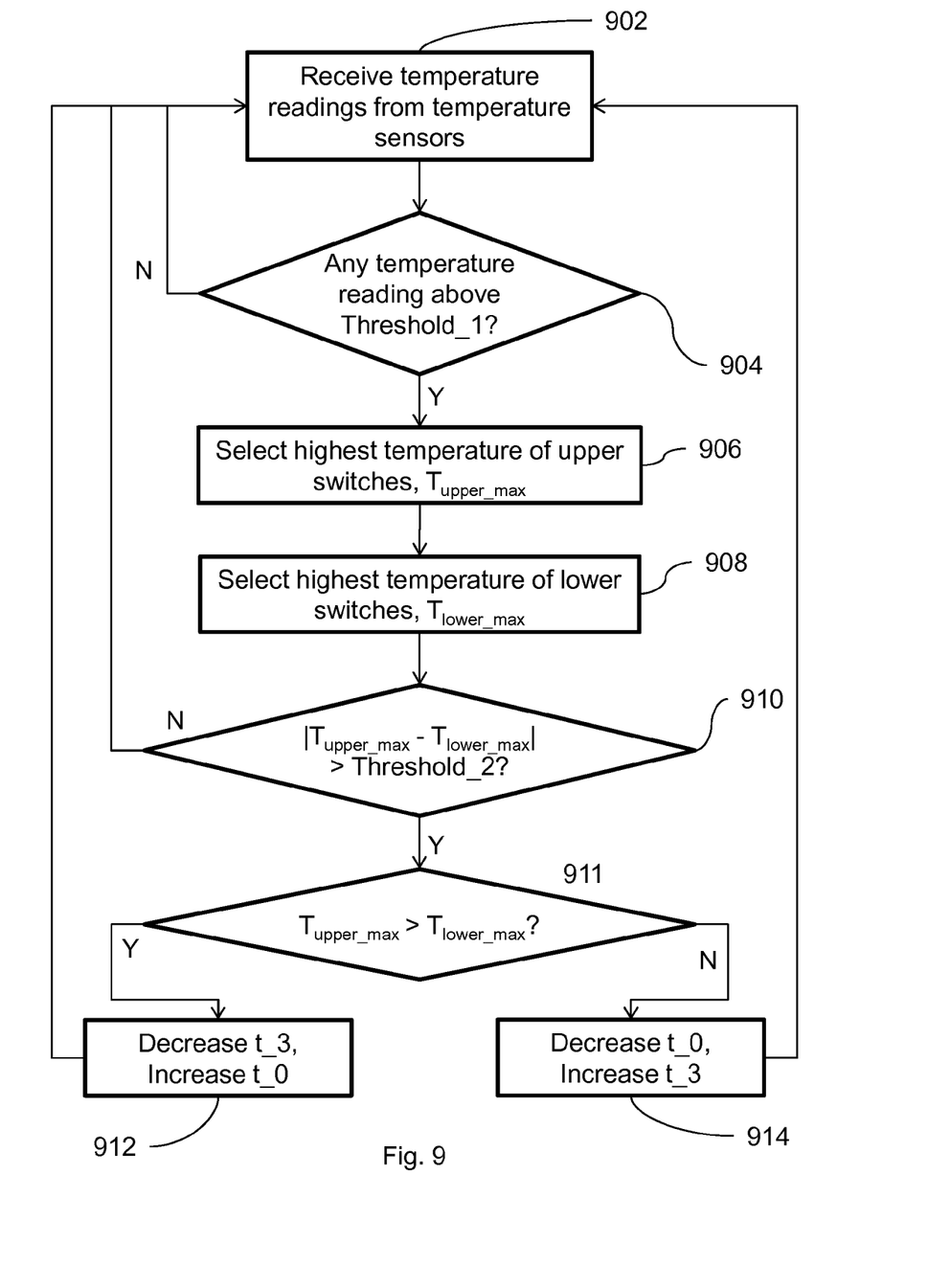
FIG. 9 shows a flow diagram for controlling the three phase inverter according to an embodiment of the disclosure.

FIG. 9 is a flow diagram illustrating one embodiment to control the switches 200a, 200b, 300a, 300b, 400a, 400b in dependence on the temperature associated with the switches. In operation 902, a control system (e.g. a processor) receives the temperature readings from temperature sensors 500 associated with the switches 200a, 200b, 300a, 300b, 400a, 400b. The control system them determines in operation 904 whether any temperature reading is above a threshold Threshold_1. This threshold is set according to the operating characteristics of the inverter and the individual components used. For instance, for an IGBT, a suitable threshold may be 110 degrees Celsius. When the control system determines in operation 904 that none of the temperature readings is above a threshold (operation 904 answered in the negative), the control system returns to operation 902 and waits to receive the next set of temperature readings.

When the control system determines in operation 904 that at least one of the temperature readings is above a threshold (operation 904 answered in the affirmative), the control system turns to operations 906 and 908 and selects the highest temperature reading for an upper switch, T_upper_max and the highest temperature reading for a lower switch, T_lower_max. The control system then determines in operation 910 whether the absolute difference between T_upper_max and T_lower_max is greater than a threshold Threshold_2 (for example 5° C.) to provide a margin for hysteresis. If not (operation 910 answered in the negative) then the control system returns to operation 902 and waits to receive the next set of temperature readings (or takes other action that is not discussed further in this disclosure). If the absolute difference between T_upper_max and T_lower_max is greater than a threshold Threshold_2 (operation 910 answered in the affirmative) then the control system determines in operation 911 whether T_upper_max is greater than T_lower_max. If so (operation 911 answered in the affirmative) then the control system adjusts the inactive time period to decrease the inactive time period t_3 (upper switches 200a, 300a, 400a ON) and increase the inactive time period t_0 (lower switches 200b, 300b, 400b ON). This results in the active period within the PWM period switching pattern being slowly moved so that the upper switches are ON for less time than the lower switches. Similarly when the control system determines in operation 911 that T_upper_max is less than T_lower_max (operation 911 answered in the negative) then the control system adjusts the inactive time period to decrease the inactive time period t_0 (lower switches 200b, 300b, 400b ON) and increase the inactive time period t_3 (upper switches 200a, 300a, 400a ON). This means that the active period within the PWM period switching pattern may be slowly moved so that the lower switches are ON for less time than the upper switches. Thus, if the lower switches (200b, 300b, 400b) are warmer than the upper switches (200a, 300a, 400a) (given a hysteresis), the active period within the PWM period switching pattern may be slowly moved so that the lower switches are ON for less time than the upper switches.

The control system may adjust t_0 (and hence t_3) or t_3 (and hence t_0) in a gradual manner (say between t_3_min and t_3_max) until all temperature readings are below the threshold. This may be subject to a time constant (for example one second) i.e. a one second time constant means that the adjustment of the ratio of t_0 to t_3 changes from maximum (t_0_max:t_3_min) to minimum (t_0_min:t_3_max) in one second. The value of t_0 and t_3 may be changed in fixed increments or in a continuous manner. Alternatively the control system may adjust t_0 and t_3 in an increment dependent upon the magnitude of the highest temperature reading. The change in ratio may be controlled by proportional, integral and derivative (PID) control techniques. Alternatively, the control means may adjust the t−0/t_3 ratio in any other suitable manner.

Figure 10:
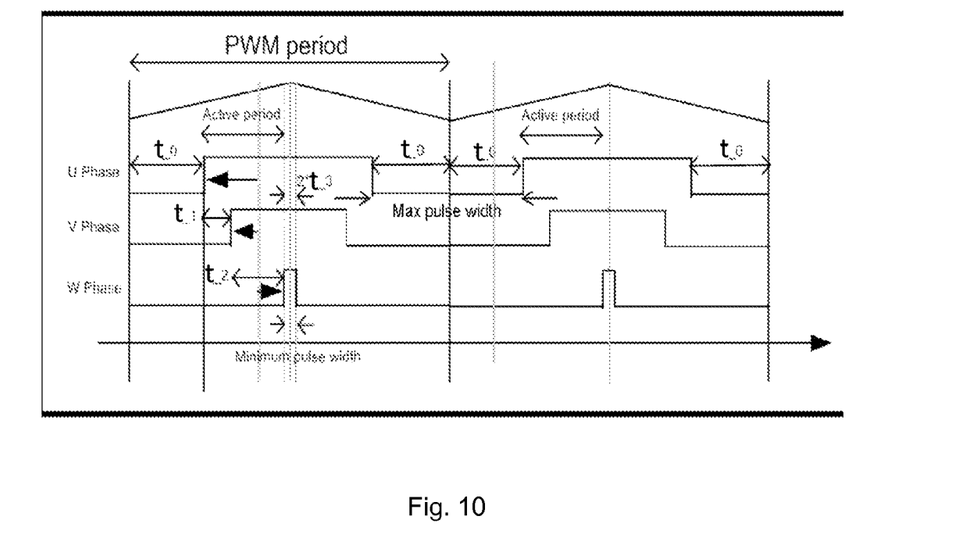
FIG. 10 shows an example of space vector modulation over one switching period according to an embodiment of the disclosure with t_3 being at its minimum.

FIG. 10 shows an example of pulse width space vector modulation over one switching period according to an embodiment of the described technique. Again, the switching function for each phase U, V, W is a time waveform taking the value 1 when the upper switch is on and 0 when the upper switch is off. In FIG. 10, the total active period is t_1+t_2, as before, and the total inactive period is $t_i$ as before, the total inactive period $t_i$ including a portion t_0 before the active period and a portion t_3 after the active period, where t_0+t_3=$t_i$. However, in the modulation scheme illustrated in FIG. 10, t_0 and t_3 are changed in response to temperature of the switching elements of the switching device and t_0 and t_3 are not necessarily equal. Changing the ratio of t_0 to t_3 can be used to alter the ratio of upper to lower conduction times while still maintaining the same line to line voltage (as long as the sum of t_0 and t_3 remains constant).

The inventors have found that changing the ratio of t_0 to t_3 in a switching period (whilst keeping t_0+t_3=$t_i$ to produce the desired output voltage) can help manage the temperature of individual switches 200a, 300a, 400a, 200b, 300b, 400b of the switching device of the power converter. This is particularly advantageous for low output frequencies because at low output frequencies each switch is on for longer than at higher frequencies and the difference in temperature between switches is larger. In simple terms, the magnitude of the line to line voltage vector produced depends on the ratio of the active period to the PWM period and the angle of the line to line voltage vector produced depends on the ratio of t_1 and t_2 and the order of the edges. The active period is equal to t_1 plus t_2 and the PWM period is equal to 2*(t_0+Active period+t_3) or 2*(t_0+t_1+t_2+t_3).

The preferred ratio of t_0 to t_3 in a given switching period is set in response to the operating temperature associated with individual switches in the switching device.

At low output frequencies (<1 Hz) the ratio in temperature of the upper and lower IGBTs can be altered by offsetting the output phase voltages (as referenced to half the DC bus.) This can be achieved by controlling the PWM switching pattern which results in a change in the IGBT ON times. For example, if the upper switches (200a, 300a, 400a) are warmer than the lower switches (200b, 300b, 400b) (given a hysteresis), the active period within the PWM period switching pattern is slowly moved so that the upper switches are ON for less time than the lower switches subject to a time constant (for example one second). Similarly if the lower switches (200b, 300b, 400b) are warmer than the upper switches (200a, 300a, 400a) (given a hysteresis), the active period within the PWM period switching pattern is slowly moved so that the lower switches are ON for less time than the upper switches, subject to a time constant (for example one second).

The ratio of t_0 to t_3 can be altered to produce asymmetric switching which produces an offset on the phase voltage waves (as referenced to half the DC bus). The ON times of the upper switches will be at their lowest when t_3 equals half the minimum pulse width. The ON times of the lower switches will be at their lowest when t_0 equals half the minimum pulse width. The minimum pulse width will depend on the operating characteristics of an individual inverter but in general is the minimum period to allow switching of a switch (e.g. an IGBT) to occur.

The resulting line to line voltages will be unchanged as long as the t_1 and t_2 periods are not changed (the sum of which is the active period) and thus the sum of t_0 and t_3 remains the same. Also the resulting line to line voltages will be unchanged as long as t_0 and t_3 are greater or equal to half the minimum pulse width (as any further reduction will result in pulse dropping which will affect the line to line voltages).

Figure 11:
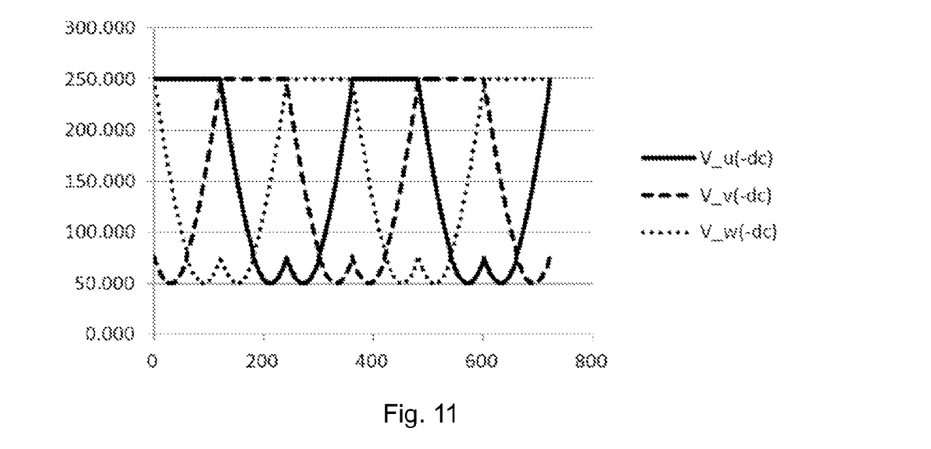
FIG. 11 shows the phase voltages (with respect to the negative DC bus) versus output voltage angle with asymmetric switching (t_0≠t_3) with t_3 being at its minimum.

FIG. 10 shows a phase switching diagram with asymmetric switching (t_0≠t_3). The minimum value for t_3 is half the minimum pulse width (i.e. the minimum pulse width is 2*t_3_min). As can be seen in FIG. 10, the PWM pattern plot shows how the ON times of all three upper IGBTs have been reduced (compared with that shown in FIG. 3) as t_3 has been reduced (t_3 is an element of all of the upper IGBT ON times). The ON times of the upper IGBTS will be lowest when t_3 equals half the minimum pulse width (as shown in FIG. 10). FIG. 11 shows the phase voltages (with respect to the negative half DC bus) versus output voltage angle with asymmetric switching (t_0≠t_3) with t_3 being at its minimum ((2*t_3)=minimum pulse width).

The D and Q axis components of the desired output voltage for two output wave cycles versus output voltage angle and the D and Q axis components of the desired output voltage as plotted on the X and Y axis remains unchanged as long as the sum of t_0 and t_3 remains constant. Similarly the resulting line to line voltage as seen by the motor load is unchanged as long as the sum of t_0 and t_3 remains constant.

Figure 12:
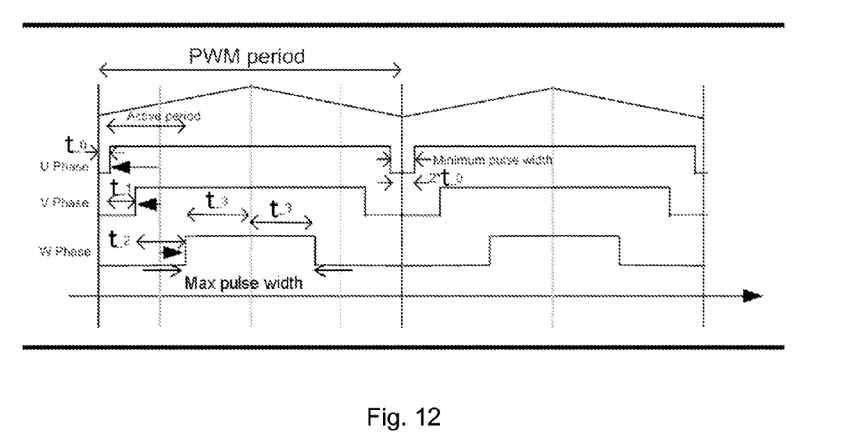
FIG. 12 shows an example of space vector modulation over one switching period according to an embodiment of the disclosure with t_0 being at its minimum.
Figure 13:
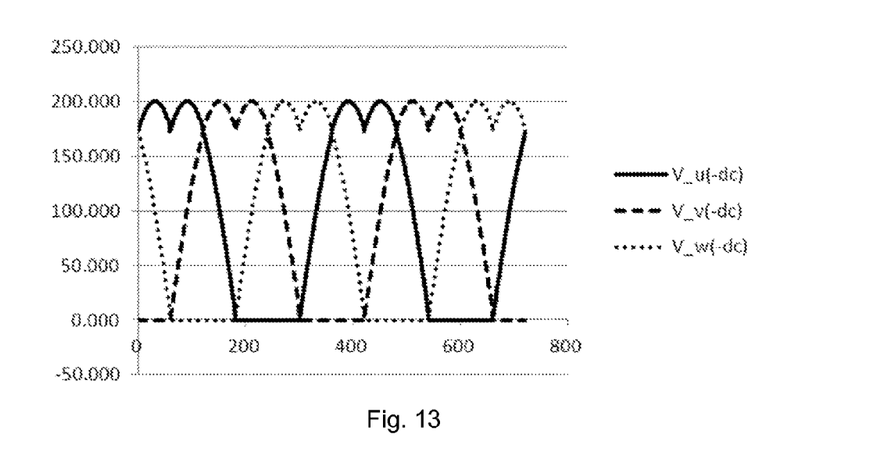
FIG. 13 shows the phase voltages (with respect to the negative DC bus) versus output voltage angle with asymmetric switching (t_0≠t_3) with t_0 being at its minimum.

FIG. 12 shows a phase switching diagram with asymmetric switching (t_0≠t_3). The minimum value for t_0 is half the minimum pulse width (i.e. the minimum pulse width is 2*t_0_min). As can be seen in FIG. 12, the PWM pattern plot shows how the ON times of all three lower IGBTs have been reduced (compared with that shown in FIG. 3 or FIG. 10) as t_0 has been reduced (t_0 is an element of all of the lower IGBT ON times). The ON times of the lower IGBTS will be lowest when t_0 equals half the minimum pulse width (as shown in FIG. 12). FIG. 13 shows the phase voltages (with respect to the negative half DC bus) versus output voltage angle with asymmetric switching (t_0≠t_3) with t_0 being at its minimum ((2*t_0)=minimum pulse width).

Thus t_0 may be varied between t_0_max (as shown in FIG. 10) and t_0_min (as shown in FIG. 12) with t_3 being varied between t_3_min (as shown in FIG. 10) and t_3_max (as shown in FIG. 12) while maintaining the total inactive period ti=t_0+t_3 constant, with the resulting phase voltages altering between that shown in FIG. 11 to that shown in FIG. 13 respectively. The ON times of the upper IGBTS will be lowest when t_3 equals t_3_min (half the minimum pulse width) as shown in FIG. 10. The ON times of the lower IGBTS will be lowest when t_0 equals t_0_min (half the minimum pulse width) as shown in FIG. 12. t_0 and t_3 are adjusted in response to the operating temperature of the switching device to enable temperature of the switching device to be managed.

In the foregoing specification, techniques have been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Embodiments have been described herein in relation to IGBT switches. However the method and apparatus described are not intended to be limited to these types of switches but may be applicable to other switches.

The invention claimed is:

1. A method for controlling a switching device in a power converter according to a modulation scheme, the switching device for coupling a direct current (DC) source to provide an alternating current (AC) output at a particular switching frequency, the method comprising:
   in each of a plurality of switching periods, switching the switching device between active configurations providing a finite voltage at the AC output and inactive configurations providing a zero voltage at the AC output;
   wherein a ratio between a total period of time in which the switching device is in an active configuration and a total period of time in which the switching device is in an inactive configuration is the same for each of the plurality of switching periods and is determined according to a desired voltage at the AC output; and
   wherein, in each of the plurality of switching periods, there are at least two time periods in which the switching device is in the inactive configuration, and a ratio between those at least two time periods is changed in dependence on temperature associated with the switching device.

2. The method of claim 1, wherein the switching device comprises a plurality of individual switches and wherein the ratio between the at least two time periods in which the switching device is in the inactive configuration is changed in a switching period of the plurality of switching periods in response to temperature readings associated with the plurality of individual switches of the switching device.

3. The method of claim 2 further comprising, when at least one of the temperature readings is above a threshold, adjusting the at least two time periods in which the switching device is in the inactive configuration to decrease one of the at least two time periods and increase another one of the at least two time periods so that an occurrence of an active period within the switching period in which the switching device is in an active configuration is altered.

4. The method of claim 1, wherein the switching device is a multiphase device comprising two individual switches in each phase of the switching device, and wherein the ratio between the at least two time periods in which the switching device is in the inactive configuration is changed in response to temperature readings associated with individual switches of the switching device.

5. The method of claim 1, the method further comprising:
   receiving temperature readings from temperature sensors associated with switches of the switching device;
   determining whether any one of the received temperature readings is above a threshold; and
   when at least one of the received temperature readings is above a threshold, adjusting a first of the at least two time periods in which the switching device is in the inactive configuration to decrease the first of the at least two time periods and adjusting a second of the at least two time periods in which the switching device is in the inactive configuration to increase the second of the at least two time periods.

6. The method according to claim 5 wherein the switching device comprises a multi-phase device in which each phase of the switching device comprises two switches, one of the two switches connected to a higher voltage rail and another one of the two switches connected to a lower voltage rail, wherein the adjusting of the first of the at least two time periods in which the switching device is in the inactive configuration to decrease the first of the at least two time periods causes said one of the two switches connected to the higher voltage rail to be conductive for less time than said another one of the two switches connected to the lower voltage rail.

7. The method according to claim 5 wherein the switching device comprises a multi-phase device in which each phase of the switching device comprises two switches, one of the two switches connected to a higher voltage rail and another one of the two switches connected to a lower voltage rail, wherein the adjusting of the first of the at least two time periods in which the switching device is in the inactive configuration to decrease the first of the at least two time periods causes said another one of the two switches connected to the lower voltage rail to be conductive for less time than said one of the two switches connected to the higher voltage rail.

8. The method of claim 1 wherein the ratio between the at least two time periods is changed by at least one of an incremental manner and according to proportional and integral control techniques.

9. A power converter switching device control system, the switching device for coupling a direct current (DC) source to provide an alternating current (AC) output at a particular switching frequency, the power converter switching device control system comprising:
 a controller for switching the switching device in the power converter according to a modulation scheme, the controller being arranged to switch the switching device, in each of a plurality of switching periods, between active configurations providing a finite voltage at the AC output and inactive configurations providing a zero voltage at the AC output;
 wherein a ratio between a total period of time in which the switching device is in an active configuration and a total period of time in which the switching device is in an inactive configuration is the same for each of the plurality of switching periods and is determined according to a desired voltage at the AC output; and
 wherein, in each of the plurality of switching periods, there are at least two time periods in which the switching device is in the inactive configuration, and a ratio between those at least two time periods is changed in dependence on temperature associated with the switching device.

10. The control system of claim 9, wherein the switching device comprises a plurality of individual switches and wherein the ratio between the at least two time periods in which the switching device is in the inactive configuration is changed in response to temperature readings associated with the plurality of individual switches of the switching device.

11. The control system of claim 10 wherein, when at least one of the temperature readings is above a threshold, the controller is arranged to adjust the at least two time periods in which the switching device is in the inactive configuration to decrease one of the at least two time periods and increase another one of the at least two time periods so that an occurrence of an active period within a switching period of the plurality of switching periods in which the switching device is in an active configuration is altered.

12. The control system of any claim 9, the control system further arranged to:
 receive temperature readings from temperature sensors associated with switches of the switching device;
 determine whether any one of the received temperature readings is above a threshold; and
 when at least one of the received temperature readings is above a threshold, adjust a first of the at least two time periods in which the switching device is in the inactive configuration to decrease the first of the at least two time periods and adjust a second of the at least two time periods in which the switching device is in the inactive configuration to increase the second of the at least two time periods.

13. The control system of claim 12 wherein the switching device comprises a multi-phase device in which each phase of the switching device comprises two switches, one of the two switches connected to a higher voltage rail and another one of the two switches connected to a lower voltage rail, wherein the control system arranged to adjust the first of the at least two time periods in which the switching device is in the inactive configuration to decrease the first of the at least two time periods causes said one of the two switches connected to the higher voltage rail to be conductive for less time than said another one of the two switches connected to the lower voltage rail.

14. The control system of claim 12 wherein the switching device comprises a multi-phase device in which each phase of the switching device comprises two switches, one of the two switches connected to a higher voltage rail and another one of the two switches connected to a lower voltage rail, wherein the control system arranged to adjust the first of the at least two time periods in which the switching device is in the inactive configuration to decrease the first of the at least two time periods causes said another one of the two switches connected to the lower voltage rail to be conductive for less time than said one of the two switches connected to the higher voltage rail.

15. The control system of claim 9, wherein the power converter comprises a three phase power inverter.

16. The control system of claim 9, wherein the power converter comprises a three phase power inverter and at least one switch in the three phase inverter is an insulated gate bipolar transistor (IGBT).

17. A switching power converter comprising:
 a switching device for coupling a direct current (DC) source to provide an alternating current (AC) output at a particular switching frequency; and
 a controller for controlling the power converter by switching the switching device according to a modulation scheme, the controller being arranged to switch the switching device, in each of a plurality of switching periods, between active configurations providing a finite voltage at the AC output and inactive configurations providing a zero voltage at the AC output;
 wherein a ratio between a total period of time in which the switching device is in an active configuration and a total period of time in which the switching device is in an inactive configuration is the same for each of the plurality of switching periods and is determined according to a desired voltage at the AC output; and
 wherein, in each of the plurality of switching periods, there are at least two time periods in which the switching device is in the inactive configuration, and a ratio between those at least two time periods is changed in dependence on temperature associated with the switching device.

18. The switching power converter of claim 17, wherein the switching device comprises a plurality of individual switches and wherein the ratio between the at least two time periods in which the switching device is in the inactive configuration is changed in response to temperature readings associated with the plurality of individual switches of the switching device.

19. The switching power converter of claim 18 wherein, when at least one of the temperature readings is above a threshold, the controller is arranged to adjust the at least two time periods in which the switching device is in the inactive configuration to decrease one of the at least two time periods and increase another one of the at least two time periods so that an occurrence of an active period within a switching period of the plurality of switching periods in which the switching device is in an active configuration is altered.

20. The switching power converter of claim 17, the control system further arranged to:
 receive temperature readings from temperature sensors associated with switches of the switching device;

determine whether any one of the received temperature readings is above a threshold; and when at least one of the received temperature readings is above a threshold, adjust a first of the at least two time periods in which the switching device is in the inactive configuration to decrease the first of the at least two time periods and adjust a second of the at least two time periods in which the switching device is in the inactive configuration to increase the second of the at least two time periods.

21. The switching power converter of claim 20 wherein the switching device comprises a multi-phase device in which each phase of the switching device comprises two switches, one of the two switches connected to a higher voltage rail and another one of the two switches connected to a lower voltage rail, wherein the control system arranged to adjust the first of the at least two time periods in which the switching device is in the inactive configuration to decrease the first of the at least two time periods causes said one of the two switches connected to the higher voltage rail to be conductive for less time than said another one of the two switches connected to the lower voltage rail.

22. The switching power converter of claim 20 wherein the switching device comprises a multi-phase device in which each phase of the switching device comprises two switches, one of the two switches connected to a higher voltage rail and another one of the two switches connected to a lower voltage rail, wherein the control system arranged to adjust the first of the at least two time periods in which the switching device is in the inactive configuration to decrease the first of the at least two time periods causes said another one of the two switches connected to the lower voltage rail to be conductive for less time than said one of the two switches connected to the higher voltage rail.

23. The switching power converter of claim 17, wherein the power converter comprises a three phase power inverter.

24. The switching power converter of claim 17, wherein the power converter comprises a three phase power inverter and at least one switch in the three phase inverter is an insulated gate bipolar transistor (IGBT).

25. The switching power converter of claim 17, wherein the power converter comprises a three phase power inverter and the ratio between the at least two time periods in which the switching device is in the inactive configuration is weighted towards configurations in which a selected switch in each phase of the three phase inverter is on.

* * * * *